(12) United States Patent
Green

(10) Patent No.: US 9,896,355 B2
(45) Date of Patent: Feb. 20, 2018

(54) METHOD AND APPARATUS FOR AN EXPANDABLE INDUSTRIAL WASTE WATER TREATMENT SYSTEM

(71) Applicants: Changzhou Sunwood Environmental Technology & Equipment Co., Ltd., Changzhou, Jiangsu (CN); Instant Water Technologies, LLC., Las Vegas, NV (US)

(72) Inventor: Michael Green, Pacheco, CA (US)

(73) Assignee: Michael Green, Pacheco, CA (US)

( * ) Notice: Subject to any disclaimer, the term of this patent is extended or adjusted under 35 U.S.C. 154(b) by 248 days.

(21) Appl. No.: 14/599,379

(22) Filed: Jan. 16, 2015

(65) Prior Publication Data

US 2015/0203375 A1     Jul. 23, 2015

Related U.S. Application Data

(60) Provisional application No. 61/930,283, filed on Jan. 22, 2014.

(51) Int. Cl.

| | |
|---|---|
| *C02F 1/463* | (2006.01) |
| *C02F 1/467* | (2006.01) |
| *C02F 1/465* | (2006.01) |
| C02F 1/461 | (2006.01) |
| C02F 101/32 | (2006.01) |

(52) U.S. Cl.
CPC ............ *C02F 1/463* (2013.01); *C02F 1/4672* (2013.01); *C02F 1/465* (2013.01); *C02F 2001/46142* (2013.01); *C02F 2101/32* (2013.01); *C02F 2201/4617* (2013.01)

(58) Field of Classification Search
CPC ........ C02F 1/463; C02F 1/4672; C02F 1/465; C02F 2001/46142; C02F 2101/32; C02F 2201/4617

See application file for complete search history.

(56) References Cited

U.S. PATENT DOCUMENTS

| 4,014,766 A | 3/1977 | Watanabe et al. |
| 4,035,289 A | 7/1977 | Guillerme et al. |

(Continued)

FOREIGN PATENT DOCUMENTS

| CN | 103266330 | 8/2013 | |
| WO | WO 2012151617 A1 * | 11/2012 | ............... C02F 1/463 |

*Primary Examiner* — Ciel P Thomas

(74) *Attorney, Agent, or Firm* — Polsinelli PC

(57) ABSTRACT

A waste water treatment system utilizing a series of individual modules which, when assembled, form a beginning contaminate collection chamber attached at the starting end of a main fluid treatment tank in which is housed an array of anodes and cathodes. A center contaminate collection chamber can be attached at the oppose end of the main treatment tank which provides an internal fluid pathway to allow fluid transfer from the first treatment tank into a second treatment tank. Alternatively, the center contaminate collection chamber can be used when multiples of treatment tanks are assembled to work in tandem, or an ending contaminate collection chamber can be attached to an ending treatment module to complete the expandable waste water treatment system. Expandability of the system can therefore accommodate various waste water treatment mechanisms, residence time and manner of treatment.

22 Claims, 7 Drawing Sheets

(56) References Cited

U.S. PATENT DOCUMENTS

| | | | |
|---|---|---|---|
| 7,815,804 B2 | 10/2010 | Nagghappan | |
| 2010/0181260 A1* | 7/2010 | Vroom | B63B 13/00 |
| | | | 210/748.03 |
| 2011/0036727 A1* | 2/2011 | Cao | C02F 1/4672 |
| | | | 205/743 |
| 2011/0308938 A1* | 12/2011 | Gilmore | C02F 1/46109 |
| | | | 204/228.6 |
| 2013/0146473 A1* | 6/2013 | Lambert | C25B 1/26 |
| | | | 205/510 |

* cited by examiner

METHOD AND APPARATUS FOR AN EXPANDABLE INDUSTRIAL WASTE WATER TREATMENT SYSTEM

CROSS REFERENCE TO RELATED APPLICATIONS AND CLAIM FOR PRIORITY

This application claims domestic benefit, under 35 U.S.C. § 119, of U.S. provisional patent application Ser. No. 61/930,283, filed Jan. 22, 2014, the entire disclosure of which is herein incorporated by reference in its entirety.

FIELD OF THE INVENTION

In general the present invention relates to a modular waste water treatment process in which a series of modules can be assembled to form a waste water treatment system.

BACKGROUND AND RELATED ART

According to recent reports after three years of research, in approximately 25 years, fresh water may be very scarce. Studies indicated that the entire world's population may go thirsty by 2040. Remarkably by 2020, between 30 and 40 percent of the world's population could be adversely affected by water shortages.

International water shortages now are commonly being experienced where ongoing demands continue for agriculture and manufactured goods to necessitate an ever growing population. This valuable water resource is rapidly diminishing due to ongoing worldwide droughts and the global pollution of lakes, rivers and our oceans.

Due to looming shortages, waste water recycling for manufacturing could become extremely important, not only for environmental aspects, but also to the rising costs associated with waste water treatment and water handling.

Over the years a wide variety of processes have been developed to perform waste water treatment. Typically most waste water treatment methods rely on chemical clarifiers, filters or filtration by membranes to separate contaminates or their sub-constituents from a waste water stream. Filters and membranes provide micron or submicron filtration and are commonly used to remove chemicals, salts, metals and aquatic microorganisms. U.S. Pat. No. 7,815,804 B2 to Nagghapan, is an example of a filter and membrane system which are combined and used in the treatment of a waste water stream. Nagghapan teaches the use of ion exchange followed by a filtration and membrane process to remove total suspended solids, (TSS) and total dissolved solids, (TDS) from the fluid.

Both filtration and membrane systems rely on pumps to move and push fluid through the filtration system. Contaminate volume is typically based on milligrams per liter, (mg/l) and where the life span of the filter or membrane system can be determined by the contaminate levels and to the volume of water being subjected to the filtration process. Most filters and membrane processes are maintenance intensive and are costly to replace.

Waste water treatment can also include the use of chemicals for the removal of organics and the neutralization of some types of inorganic contaminate. However the downfall of chemical treatment is the tradeoff between the treatments of harmful inorganics in exchange for potential harmful chemicals. U.S. Pat. No. 4,035,289A to Guillerme, Gratacos, Siruins and Tramier teach a method to flocculate organics with chemical agents and then the acidification of the effluent for pH balancing. Chemical treatments typically require time for activation to produce a desirable treatment result.

Electrocoagulation processes are commonly used in the treatment of waste water. Electrocoagulation involves the use of electrical current being applied to an anode and cathode and where molecular compounds can be disassociated or oxidized by means of current transfer within the influent. As for example in electrolysis, molecular disassociation of $H_2O$ takes place once 1.24 volts has been applied to an anode and cathode, this method breaks down the water molecule to produce both hydrogen and oxygen which forms a gaseous vapor consisting of micro bubbles.

Similar to water, other bi-polar molecular compounds can be disassociated by applying voltage to a waste water stream; See for example,
http://en.wikipedia.org/wiki/Chemical_polarity.

The waste water performs the duties of an electrolyte for voltage transfer between an anode and cathode, and where electro-negative or bi-polar molecules electrically react with the inputted voltage.

U.S. Pat. No. 4,035,289A to Huang, Huang, Lee and Lin teach the method of electrolytic compound reductions using ferric ions to improve a fluidized carrier, and thus a high proportion of iron (III) to iron (II) can be sustained in the system to purify waste water. However, this method requires the continual addition of hydrogen peroxide to the influent for the treatment process.

U.S. Pat. No. 4,014,766A to Watanabe and Nojiri teach a method where waste water is subjected to electrolysis within an electrolytic cell having an anode comprising as insoluble central electrode and where a body of iron particulate is disposed therearound and in electrical contact therewith, whereby impurities in the waste water become occluded within a flocculation of iron hydroxide formed by electrolytic dissolution of the iron pieces, and the flocculation containing the impurities is subjected to oxidation processing and is thereafter separated. A magnetic field can be applied to the waste water thus treated to thereby promote sedimentation of the flocculation.

China patent CN 103266330A discloses an electrolysis process utilizing a plurality of bipolar membranes within a series of tanks. The bipolar membrane polar distance electrolysis tank comprises a plurality of unit electrolysis tanks and semi-unit electrolysis tanks at two ends, an ion membrane and a sealing gasket being arranged among the plurality of unit electrolysis tanks and between the unit electrolysis tanks and the semi-unit electrolysis tanks, each of the unit electrolysis tanks comprising four frames (1), an anode chamber (2) and a cathode chamber (3) are arranged in the four frames (1), the anode disc (2.1) of the anode chamber (2) and the cathode disc (3.1) of the cathode chamber (3) are buckled on the four frames (1) in a back-to-back manner, an anode gas-liquid separation box (2.4) is arranged in the anode chamber (2), and a cathode gas-liquid separation box (3.4) is arranged in the cathode chamber (3).

SUMMARY OF THE INVENTION

A primarily object of the present invention is to provide an expandable waste water treatment system which involves a series of module sections in which can be assembled or where sections can be removed to form a waste water treatment system. This system consists of a series of contaminate collection chambers which attach to both ends of a main treatment module(s). The main treatment module(s) houses a preferred electro-chemistry method using both ion donating and mixed metal oxide anodes and cathodes. However, the present invention should not be considered, limited or interpreted as merely electro-chemistry function performed inside tanks, but where more consideration should be placed on the utility of an expandable assembly utilized for fluid treatment. Other methods such as aeration or chemical dosing can be performed in the main treatment module(s) where a fluid process may require constant flow while working in tandem with chemical mixing for a pre- or post-treatment of a fluid.

As an example of modular expandability, the treatment system utilizes a beginning collection chamber which is attached to a main electrolytic treatment module, A second or center collection chamber can be attached at the oppose end and where this center collection chamber is equipped to provide a fluid pathway for transferring fluid from a first into a second electrolytic treatment module. At the end of the second module, another center section can be placed for the addition of a third treatment module or an ending collection chamber can be installed to complete the treatment system.

The waste water influent slated for treatment can be introduced into the system in continuous flow and where this influent is used as an electrolyte for electrical conductively between an anode and cathode array. Once DC voltage is applied to the array, micro bubbles of hydrogen and oxygen are produced, and once these bubbles generate and release from the anode and cathode arrays, they begin rising up through the water column and attach to contaminate flocculations formed by electro-chemistry reactions. Once contaminates reach the surface, they can be skimmed by a surface skimming device and deposited into either the beginning, center or ending contaminate collection chambers.

In some aspects of the invention, electrodes can include sets configured in a vertical or horizontal position and composed of porous or non-porous conductive materials in which may have an applied coating over the top of metallic rods, bars or plates. Further some electrodes can include openings or numerous perforations or surface textures, such as wire mesh or perforated plates, to which increases the electrode's edges. Electrode configurations can be spaced by non-conductive materials used as insulators and where these insulators could be constructed in such a way to form internal fluid passageways. Plate electrodes can incorporate directed fluid openings in which allow fluid residence for electrical exposure over the entire surface of the electrode. Moreover, the arrangement of these electrodes can enable and enhance electrical co-coagulation of TDS (total dissolved solids) and TSS (total suspended solids) bi-polar molecular structures within a wastewater stream, or where a secondary molecule housing an anode and cathode pairing can be used to facilitate hydrogen and oxygen micron bubbles. For example, in some embodiments, an anode and cathode pairing can be placed approximately 0.062 to 10 inches apart thus configuring voltages of approximately 0.1 to 300 V applied across the pairing to initiate fluid treatment. In some embodiment, a single module system for electro-coagulation of bi-polar contaminate may include a series of anode and cathode pairings spaced apart by a series of gaskets and spacer plates known as neutrals and therefore forming the following arrangement; end cap, gasket, anode plate, gasket, neutral plate, gasket, cathode plate, gasket and end cap.

Simultaneously, an anode and cathode pairing could be utilized for dissolving a fluid in which evolves micron bubbles consisting of hydrogen and oxygen and whereas, as these micron bubbles rise up within the effluent stream, they also attach and lift TDS and TSS flocculates composed of organic or inorganic constituents to the surface for collection.

Electro-Coagulation is an electrochemistry method used to coagulate wastewater contaminates for ease of separation and collection from the wastewater stream. Wastewater when exposed to a controlled electrical field allows microscopic solids to attract, (like magnetism) forming higher concentrations of solids for greater removal efficiencies.

Selective material types or coatings applied to the anodes and cathodes provide several unique abilities in utilizing half redox ion reactions in which can enhance the fluid treatment process. Mixed Metal Oxidizes, (MMO) typically used are non-donators of ions to the influent and where based on the type of MMO's selected, certain electrochemistry reactions can occur. For example, if combining titanium anodes with ruthenium coated cathodes and if the influent contains salinity, chlorine is evolved which can be used to disinfect the effluent.

If the influent has concentrations of hydrocarbons, the electrochemistry effect allows oily-wastewater composed of suspended oil droplets interspersed with solids to neutralize and interact chemically. Therefore under suitable conditions of controlled and carefully-applied DC voltage, several unique physic-chemical effects result:

The coalescing of neutralized charges which surround hydrocarbon droplets allows them to quickly coagulate out of an emulsion. This applies to both heavy and to aromatic-hydrocarbons, with most specific results dependent upon molecular weights and their concentration within the influent.

Chemical oxidation occurs to allow the creation of free hydroxyl, OH— radicals within the influent in which rapidly and aggressively coalesce hydrocarbons, other particulate and dissolved solids. Applied DC voltage to the influent also breaks down complex organic molecules, including high molecular weight structures which may be resistant to other forms of treatment. Examples of these heavier compounds could be classified as pesticides, herbicides, dyes and wet-processed chemicals.

Biological inactivation also results from free hydroxyl radicals which rapidly and aggressively combine to destroy bacteria, viruses, cysts, macrophages and other organic biological contaminants, very similar to the effect of using ozone, but at a magnitude greater.

The electrochemistry process also works to dissolve metals by forming stable metallic oxides which rapidly precipitate from solution as particles which allow higher concentrations to be removal from the influent.

In cases where one would want to solely utilize MMO's anode and cathodes would be in the treatment of contaminate well water slated for potable or irrigation use.

The present invention used at a constant flow rate has successfully been tested to recover and remove hydrocarbons from oil field produced water, oil ballast water, drilling fluids, gas or oil pipeline entrained water and refinery processed water. Contaminant end products are coalesced, biologically inactive with oils and grease super-coagulated on the surface for collection. As quantified by the University of California, Davis, in oil well produced water tested, an oil recovery rate of 53% was achieved with the remaining hydrocarbon constituencies, (46.4%) removed by downstream filtration, achieving 99.6% overall removal efficiency.

In response to some of the aforementioned methods and systems used in the treatment of waste water will be addressed by the fields of the present invention. These and other features and advantages may be incorporated into certain embodiments of the invention which will become more fully apparent from the following description and appended claims.

Due to method redundancy required for system expansion or reduction, the present invention explanations should be interpreted as "a series of" unless otherwise noted. Therefore once explained, the present invention does not require that all the advantageous features be described herein or be incorporated into every embodiment of the invention.

BRIEF DESCRIPTION OF THE DRAWINGS

The present invention will become more fully understood from the detailed description of the accompanying drawings.

DETAILED DESCRIPTION OF THE PREFERRED EMBODIMENTS

The present invention is being presented as an affordable waste water treatment solution for industrial waste water recycling. The invention provides expandable modules in which could be used by a small "Mom and Pop" factory as well as scalable systems for large industrial applications in which to process several hundred tons of waste water daily.

Figure 1:
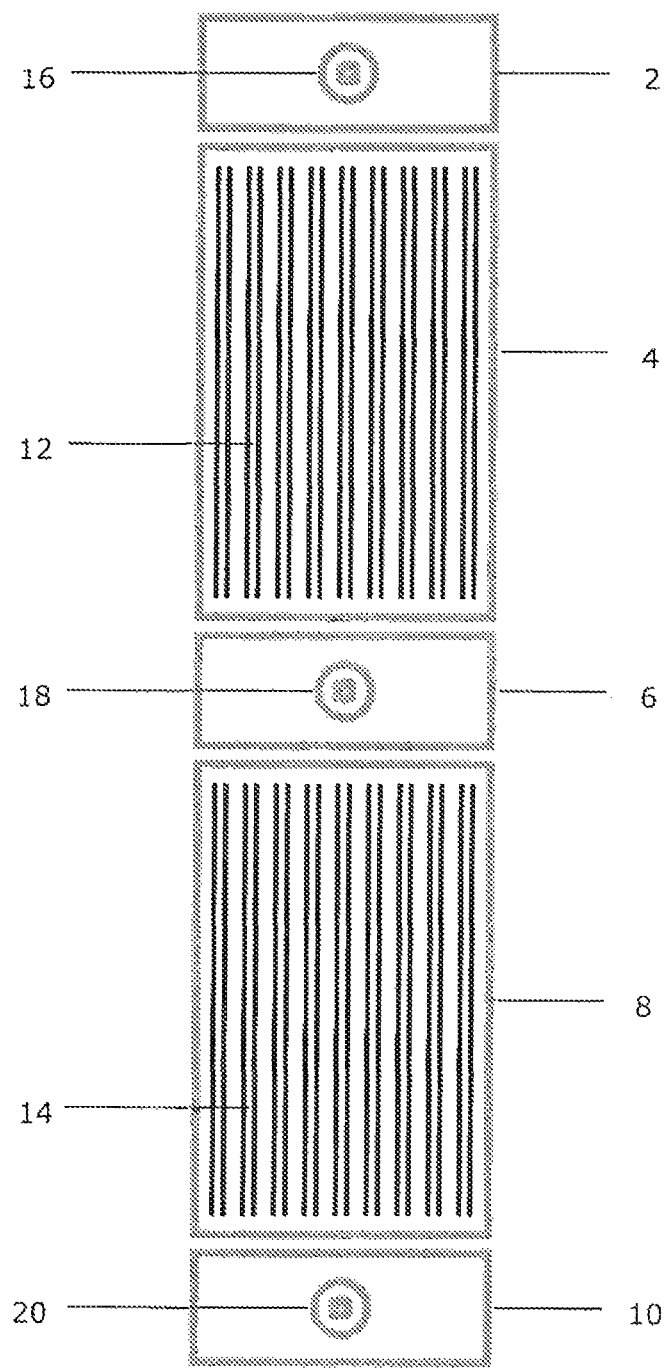
FIG. 1 illustrates the present invention as individual components required to complete an assembled system, the illustration shows three contaminates chambers in connection with two main treatment modules which house anode and cathode arrays.

FIG. 1 references a top view of the present invention which utilizes a series of contaminate collection chambers 2, 6 and 10. Contaminate collection chambers 2 and 10 are considered as beginning or ending chambers as per their relationship with main treatment modules 4 and 8. Main treatment modules 4 and 8 are separated by a center contaminate collection chamber 6. A first contaminate collection chamber 2 attaches to the beginning end of main treatment module 4, with a second or center contaminate collection chamber 6 placed at the opposite end of main treatment module 4. Center section chamber 6 provides an internal pathway for fluid transfer from the first treatment module 4, into a second treatment module 8, Center section collection chamber 6 would only be installed in cases where the waste water treatment system requires expansion in order to accommodate larger quantities of influent. Center section collection chamber 6 when installed allows a single treatment module to be expanded into multiples which work in tandem to treat the waste water influent.

Once the treatment system has been sized for influent volume, an ending or aft contaminate collection chamber 10 is installed to complete the treatment system.

Once contaminate chambers, 2, 6, and 10 are full of contaminates, drainage is accomplished through drains 16, 18 and 20. Contaminate chamber drainage can be achieved by individual chamber piping or the contaminate drain piping can connected together for evacuation to a centralized disposal location.

Main treatment modules 4 and 8 should be considered larger in size then collection chambers 2, 6 and 10, and where main treatment modules 4 and 8 provide housing for a series of anodes and cathodes, 12 and 14.

Once DC voltage is applied to the influent, anodes and cathodes 12 and 14 produce micro bubbles composed of hydrogen and oxygen. As these bubbles generate and release from the anodes and cathodes, they rise up through the water column and attach to contaminate flocculations formed by electro-chemistry reactions. Electro-Coagulation is an electrochemistry method used to coalesce contaminate in wastewater for ease of separation and collection. Wastewater when exposed to electrically controlled fields allow microscopic solids to attract, (like magnetism) forming higher concentrations of solids for greater removal efficiencies.

Once contaminates reach the surface, they can be skimmed from the surface by a skimming device which deposits collected contaminates into either the beginning 2, center 6 or ending 10 contaminate chambers.

Figure 2:
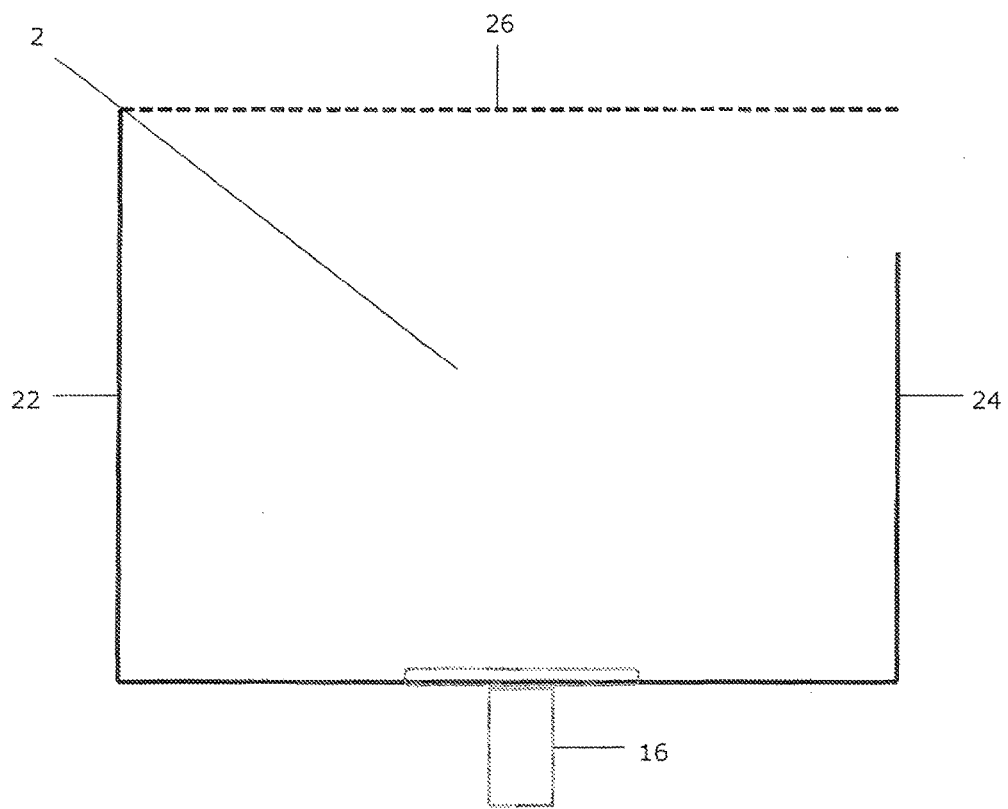
FIG. 2 illustrates a side view of the beginning contaminate chamber.
Figure 3:
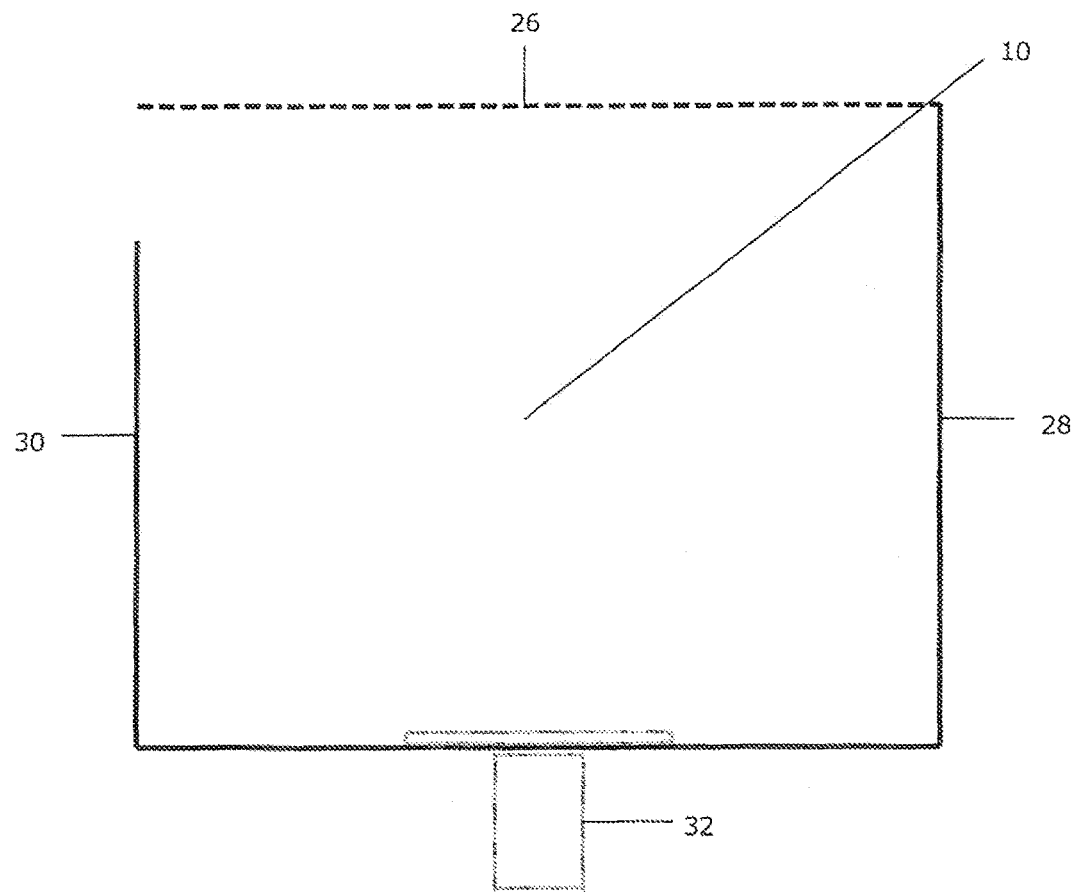
FIG. 3 illustrates a side view of the ending contaminate chamber.
Figure 4:
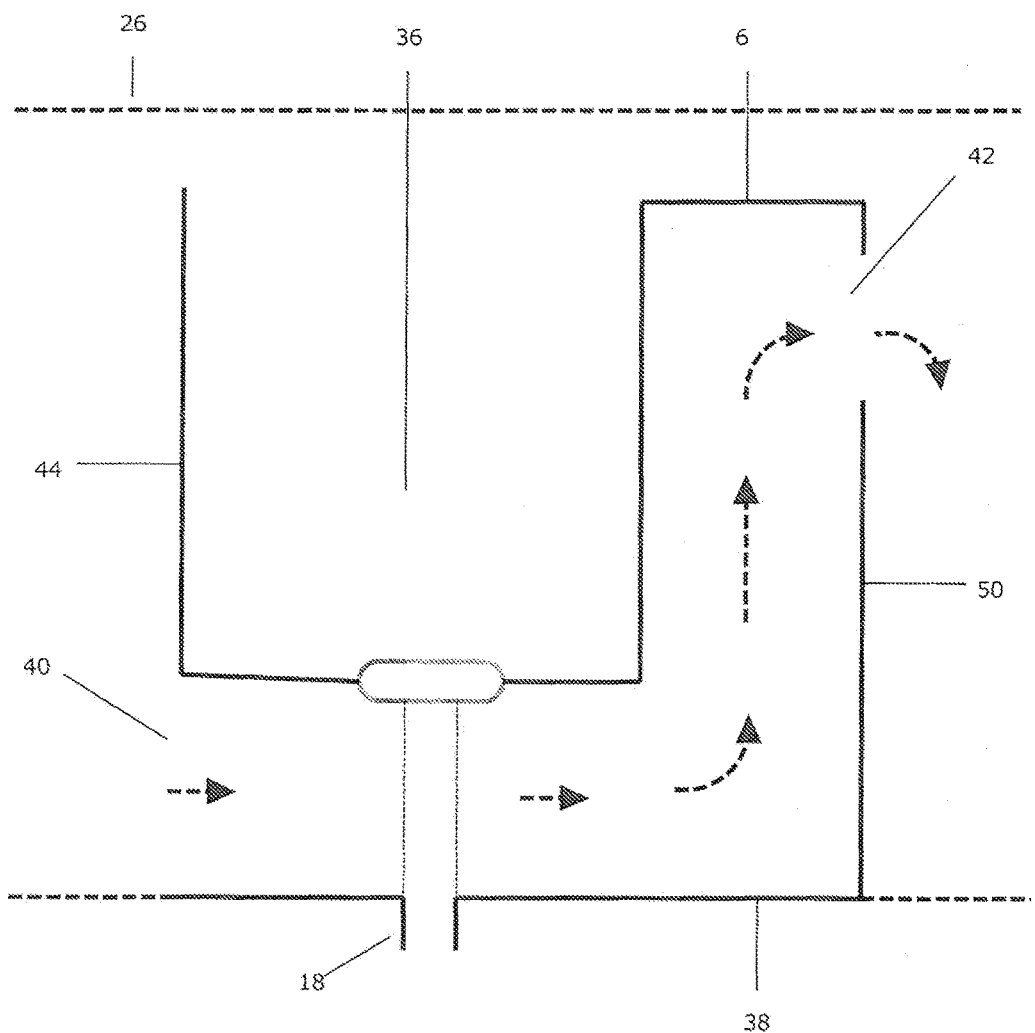
FIG. 4 illustrates a side view of the center contaminate chamber which incorporates an internal fluid pathway for fluid transfer.

Collection chamber 2 is configured slightly different than contaminate collection chamber 6 and 10 as illustrated by FIGS. 2, 3 and 4.

FIG. 2 illustrates a side view in detail of the beginning contaminate collection chamber 2. Contaminate collection chamber 2 should be considered the beginning chamber for the first main treatment module 4, as referenced in FIG. 1.

Outward facing wall 22 is configured at the same elevation as exterior side walls 26. Side walls 26 are taller in elevation than interior wall 24 and where interior wall 24 is configured lower to allow the entry and depositing of contaminates from the skimming device, into the collection chamber.

Collection chamber 2 is further equipped with a centralized drain 16 which is used to evacuate collected contaminates.

In reference to FIG. 3, ending collection chamber 10 is configured slightly different than beginning contaminate collection chamber 2 and center section 6. FIG. 3 illustrates a side view in detail of the ending contaminate collection chamber 10. Contaminate collection chamber 10 should be considered the ending chamber for a single, or the ending chamber for a series of multiple treatment modules 8, (as referenced in FIG. 1). Outward facing wall 28 is configured at the same elevation as exterior side walls 26, which are taller in elevation than interior wall 30. Interior wall 30 is configured lower to allow entry and depositing of contaminates from the skimming device onto the collection chamber.

Collection chamber 10 is equipped with a centralized drain 32 used to evacuate collected contaminates from the chamber.

Now in reference to FIG. 4, collection chamber 6 is configured to allow fluid passage from the first treatment module into a next while retaining contaminates collection and storage capabilities 36. Contaminate collection area 36 is formed by interior walls 44 and 50 and exterior side walls 26 which form a sealed enclosure located just above fluid pathway 40. Fluid entry into the center section enters at floor level 38 through opening 40 which shares a mirrored opening with treatment module wall 44. The enclosure further incorporates a contaminate drain 18 to allow collected contaminates evacuation from the enclosure. Transferring fluid must traverse around drain pipe 18 which is sealed to the bottom floor of the contaminate chamber and to floor 38 of the center section to prevent traversing fluid from escaping the pathway.

Fluid transfer is used on fluid dynamics where fluid weight achieved by the accumulation of fluid delivered into the treatment module by an electrical fluid pump. This maintains the fluid level within the first treatment module and maintains constant fluid pressure in which forces the fluid through and up into center collection chamber opening 42. Maintained accumulated fluid levels force and allow the fluid to transverse the internal pathway to produce a continuous flow of fluid into a second treatment module. The elevation of fluid opening 42 also helps to control fluid resonance time for electrochemistry reactions to occur prior to fluid transfer from the first into the second treatment module. Upon fluid treatment, a secondary electrical fluid pump is used to evacuate the effluent downstream of the treatment system.

Figure 5:
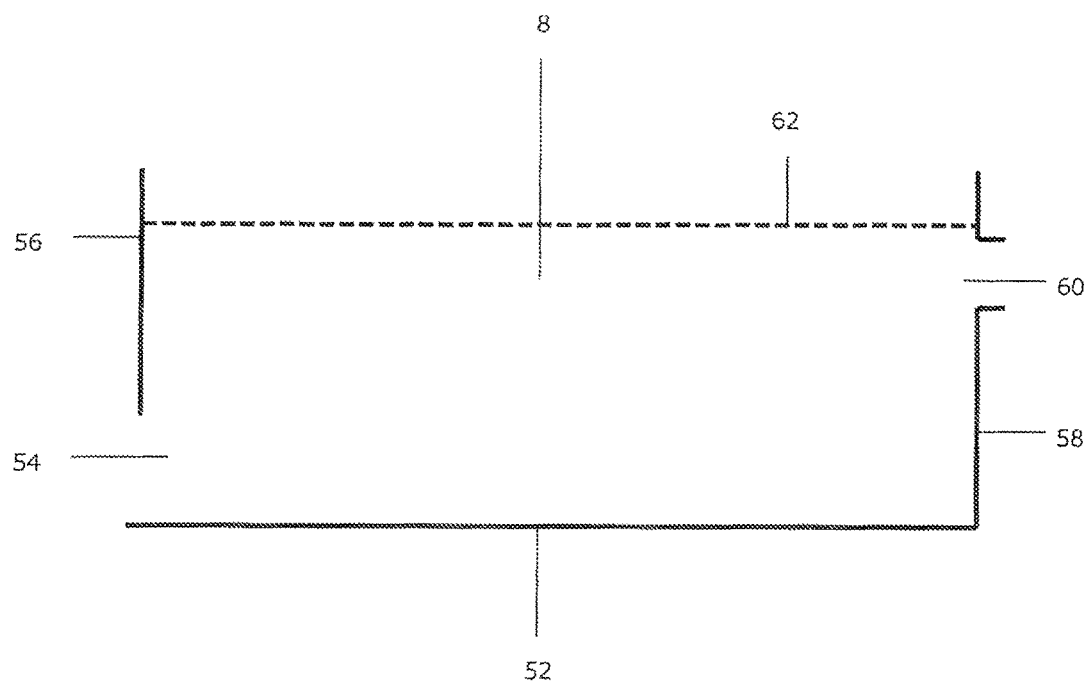
FIG. 5 illustrates a side view of a main treatment module having provisions for interconnections to individual contaminate collection chambers, the interconnections being used for system expansion or reduction.

In reference to FIG. 5, this illustration may require a left to right rotation of the module drawing to understand how the mating of sections is fully achieved.

FIG. 5 illustrates incorporated fluid opening 54 and fluid exit 60 located within outward walls, 56 and 58 of treatment module 8. Interior wall 56 when mated to the center section wall 44, (FIG. 4) shares a mirrored opening 54 with opening 40 located within center section interior wall 44. These two openings when mated allow fluid flow from the center section into the next treatment module.

In FIG. 5, numeral 52 is the floor of treatment module 8 and numeral 62 represents the level of water in treatment module 8.

Fluid exit is achieved through wall opening 42 located within outward wall 50 of the center section, (FIG. 4). When mated, wall opening 42 shares a mirrored opening with opening 60 located within outward wall 58 of the treatment module.

Figure 6:
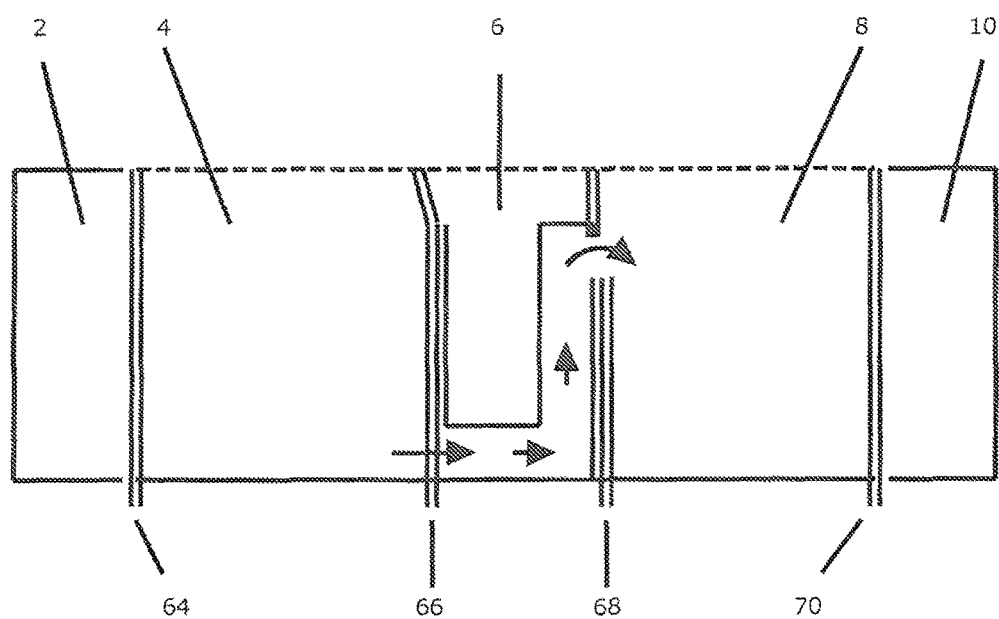
FIG. 6 illustrates a side view of an assembled system which employs outer flanges for contaminate chamber and main treatment module connection.

FIG. 6 illustrates individual components incorporating outward facing positioned flanges used to connect a next in line component. For example, center section chamber 6 would require two flanges 66 and 68, which are used to connect module 4 to module 8, Flange 64 would be used to attach the beginning contaminate chamber 2 and where flange 70 would be used to attach an additional center section 6 for system expansion, or flange 70 would be used to attach an ending contaminate collection chamber 10 for system completion.

Figure 7:
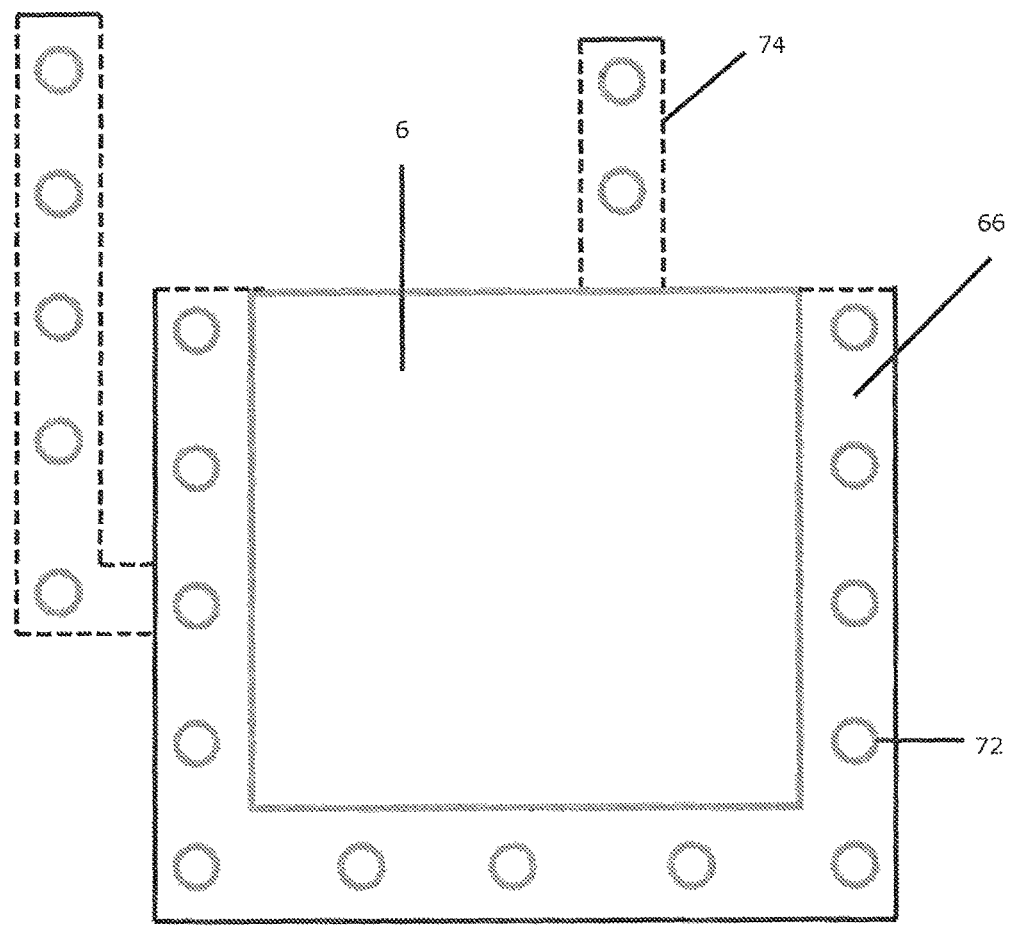
FIG. 7 illustrates a side view of a flange assembly used to connect system components.

FIG. 7 illustrates the preferred method for securing the contaminate chambers to the main treatment modules by using a series of nuts and bolts placed through incorporated holes 72 in outward facing flanges 64, 66, 68 and 70, (FIG. 6). These outward facing flanges are located at each end of the chambers around the bottom of chambers 2, 6, 10, and around the outer walls of treatment modules 4 and 8. This method would require the use of a gasket 74 placed between the flanges to prevent fluid leakage from the individual components in which interface with the waste water fluid.

Flange 66 and all other flanges incorporates a series of holes 72 used to house a series of nuts and bolts in which when tighten, applies sealing pressure to the "U" shape gasket 74 when fully tighten and mates to the flange surface. As for example, flange 66 would be constructed as a permanent fixture on each of the contaminate chambers and treatment modules. Flange 66 is mainly used to attach system components to allow system expansion or reduction as required by the waste water treatment process.

The above description of the invention reveals what would be obvious for variation and where such variations are not to be considered a deviation from the scope of the invention. Therefore such modifications which are obvious to persons skilled in the art are also to be considered comprised by the scope of the succeeding claims.

I claim:

1. An expandable waste water treatment system comprising a series of two or more treatment modules and a plurality of contaminant collection modules;
    each of the plurality of contaminant collection modules comprise a contaminant collection chamber;
    each of the two or more treatment modules comprise a treatment tank having an inlet and an outlet, and each treatment tank houses an anode and cathode array comprising a material selected from the group consisting of a mixed metal oxide, ion donating materials, and a combination thereof;
    the plurality of contaminant collection modules includes a first contaminant collection module, a last contaminant collection module, and one or more intermediate contaminant collection modules;
    the series begins with the first contaminant collection module, ends with the last contaminant collection module, and includes one of the one or more intermediate contaminant collection modules between two treatment modules of the two or more treatment modules;
    each of the one or more intermediate contaminant collection modules comprises an inlet and an outlet connected by an internal fluid pathway running beneath the contaminant collection chamber of each of the one or more intermediate contaminant collection modules, wherein the inlet of the intermediate contaminant collection module interfaces with the outlet of a treatment tank of a first treatment module of the two or more treatment modules in the series, and the outlet of the intermediate contaminant collection module interfaces with the inlet of a treatment tank of a second treatment module of the two or more treatment modules in the series.

2. The expandable waste water treatment system of claim 1, further comprising:
    a skimming device that removes flocculated contaminates at an upper surface of a fluid contained in one or more treatment tanks of the two or more treatment modules and deposits the flocculated contaminates into one or more contaminant collection chambers of the plurality of contaminant collection modules; and
    a drain that allows for removal of contaminants from the one or more of the one or more contaminant collection chambers.

3. The expandable waste water treatment system of claim 2, wherein the skimming device has a traversing ability to intersect with at least one contaminant collection chamber of the plurality of contaminant collection modules.

4. The expandable waste water treatment system of claim 1, wherein the inlet of each of the one or more intermediate contaminant collection modules is an opening at a bottom of the one or more intermediate contaminant collection modules, the opening formed by a vertical wall that does not extend completely to the bottom of the one or more intermediate contaminant collection modules.

5. The expandable waste water treatment system of claim 4, wherein the outlet of each of the one or more intermediate contaminant collection modules comprises an opening at an elevation higher than the inlet of the one or more intermediate contaminant collection modules, the opening formed by a second vertical wall that does not extend completely to a top of the one or more intermediate contaminant collection modules.

6. The expandable waste water treatment system of claim 1, further comprising a controlled fluid duration element for electrical exposure within one or more treatment tanks of the two or more treatment modules.

7. The expandable waste water treatment system of claim 1, wherein the contaminant collection chamber of each of the one or more intermediate contaminant collection modules comprises two interior walls that are shorter in height than exterior side walls of the contaminant collection chambers of the plurality of contaminant collection modules.

8. The expandable waste water treatment system of claim 1, wherein each of the contaminant collection chambers of the one or more intermediate contaminant collection modules comprises a drain port at a bottom of each of the contaminant collection chambers that transits through the bottom of the one or more intermediate contaminant collection modules.

9. The expandable waste water treatment system of claim 1, wherein the collection chamber of the first contaminant collection module comprises an outward facing wall, two sidewalls, and an interior wall, the interior wall being lower in elevation than the two sidewalls and the outward facing wall.

10. The expandable waste water treatment system of claim 9, wherein the collection chamber of the first contaminant collection module comprises a drain port at a bottom thereof.

11. The expandable waste water treatment system of claim 1, wherein the collection chamber of the last contaminant collection module comprises an outward facing wall, two sidewalls, and an interior wall, the interior wall being lower in elevation than the two sidewalls and the outward facing wall.

12. The expandable waste water treatment system of claim 11, wherein the collection chamber of the last contaminant collection module comprises a drain port at a bottom thereof.

13. The expandable waste water treatment system of claim 1 comprising a DC power source.

14. The expandable waste water treatment system of claim 13, wherein the DC power source is operatively connected to the anode and cathode arrays housed in the treatment tanks of each of the two or more treatment modules.

15. The expandable waste water treatment system of claim 1 comprising an electrical powered fluid pump.

16. The expandable waste water treatment system of claim 1, wherein each anode and cathode array comprises a mixed metal oxide.

17. The expandable waste water treatment system of claim 1, wherein each anode and cathode array is selected from the group consisting of solid plates, perforated plates, mesh, rods, bars, porous materials, and a combination thereof.

18. The expandable waste water treatment system of claim 1, wherein one or more of the anode and cathode arrays housed in the treatment tanks of the two or more treatment modules comprise at least one mixed metal oxide.

19. The expandable waste water treatment system of claim 18, wherein one or more of the anode and cathode arrays housed in the treatment tanks of the two or more treatment modules comprise a coating, said coating utilizing half redox ion reactions.

20. The expandable waste water treatment system of claim 18, wherein one or more of the anode and cathode arrays housed in the treatment tanks of the two or more treatment modules comprise titanium.

21. The expandable waste water treatment system of claim 18, wherein one or more of the anode and cathode arrays housed in the treatment tanks of the two or more treatment modules comprise a ruthenium coating.

22. The expandable waste water treatment system of claim 18, wherein one or more of the anode and cathode arrays housed in the treatment tanks of the two or more treatment modules comprise one or more anodes and one or more cathodes, the one or more anodes comprising a mixed metal oxide comprising titanium and the one or more cathodes comprising a ruthenium coating.

* * * * *